US011702954B1

(12) United States Patent
Valois et al.

(10) Patent No.: US 11,702,954 B1
(45) Date of Patent: Jul. 18, 2023

(54) MONITORING ENGINE OPERATION (71) Applicant: Pratt & Whitney Canada Corp., Longueuil (CA)

(72) Inventors: Patrick Valois, Longueuil (CA); Robert Wigny, Bolton (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 17/744,225

(22) Filed: May 13, 2022

(51) Int. Cl.
  *F01D 21/00* (2006.01)
  *G01M 15/14* (2006.01)
  *F02C 7/00* (2006.01)

(52) U.S. Cl.
  CPC .............. *F01D 21/003* (2013.01); *F02C 7/00* (2013.01); *G01M 15/14* (2013.01); *F05D 2220/323* (2013.01); *F05D 2260/80* (2013.01)

(58) Field of Classification Search
  CPC ........ F01D 21/003; F02C 7/00; G01M 15/14; F05D 2220/323; F05D 2260/80
  See application file for complete search history.

(56) References Cited

U.S. PATENT DOCUMENTS

| | | | |
|---|---|---|---|
| 6,567,729 B2 | 5/2003 | Betters | |
| 7,031,812 B1 | 4/2006 | Pettigrew | |
| 7,031,878 B2 | 4/2006 | Cuddihy | |
| 7,577,549 B2 | 8/2009 | Osborn | |
| 9,797,328 B2 | 10/2017 | Martinez | |
| 11,022,524 B2 | 6/2021 | Ma | |
| 11,067,592 B2 | 7/2021 | Hurst | |
| 11,181,898 B2 | 11/2021 | Akkaram | |
| 2013/0024179 A1* | 1/2013 | Mazzaro | F01D 17/20 703/18 |
| 2013/0046507 A1 | 2/2013 | Vega Paez | |

* cited by examiner

Primary Examiner — Jacob M Amick
(74) Attorney, Agent, or Firm — Getz Balich LLC (57) ABSTRACT

A method is provided for an engine. During this method, a database is provided for a parameter of the engine. The database includes a plurality of values for the parameter determined over a period of time. Confidence bands are established using a probability density function on the database. An action is performed in response to a comparison of a first updated value for the parameter to the confidence bands. The engine may be configured as a gas turbine engine or another type of heat engine.

20 Claims, 8 Drawing Sheets

MONITORING ENGINE OPERATION

TECHNICAL FIELD

This disclosure relates generally to a heat engine and, more particularly, to monitoring operation of the heat engine.

BACKGROUND INFORMATION

Various systems and methods are known in the art for monitoring operation of a heat engine such as a gas turbine engine. While these known monitoring systems and methods have various advantages, there is still room in the art for improvement. There is a need in the art therefore for improved systems and methods for monitoring operation and, more particularly for example, health of a heat engine.

SUMMARY

According to an aspect of the present disclosure, a method is provided for a heat engine. During this method, a database is provided for a parameter of the heat engine. The database includes a plurality of values for the parameter determined over a period of time. Confidence bands are established using a probability density function on the database. An action is performed in response to a comparison of a first updated value for the parameter to the confidence bands.

According to another aspect of the present disclosure, another method is provided for a heat engine. During this method, a database is provided for a parameter of the heat engine. The database includes a plurality of values for the parameter determined over a period of time. Confidence bands are established using a probability density function on the database. The confidence bands are extrapolated over a future period of time to provide extrapolated confidence bands. A trend is predicted for one or more future values of the parameter over the future period of time. An action is performed where the trend crosses one of the extrapolated confidence bands.

According to still another aspect of the present disclosure, an aircraft system is provided that includes a heat engine and a monitoring system. The monitoring system includes a memory and a processing device. The memory is configured to store a database for a parameter of the heat engine. The database includes a plurality of values for the parameter determined by the engine monitoring system over a period of time. The processing device is configured to establish confidence bands using a probability density function on the database. The processing device is configured to perform an action in response to a comparison of an updated value determined following the period of time to the confidence bands.

The heat engine may be configured as or otherwise include a gas turbine engine.

The method may also include performing another action where the trend crosses an operating limit for the parameter.

The method may also include performing another action where a change in a slope of the trend is greater than a threshold.

The method may also include: receiving a first updated value for the parameter; and performing an action in response to a comparison of the first updated value to the confidence bands.

The parameter may be indicative of: a temperature within the heat engine; a pressure within the heat engine; or a rotational speed of a component within the heat engine.

The values within the database may be determined when the heat engine is operated at, or within a tolerance of, an operating condition.

The operating condition may be indicative of: an altitude; a speed; a temperature of ambient air outside of the heat engine; or a temperature of air within the heat engine.

The values within the database may be determined when the heat engine is operated at, or within a tolerance of, an operating regime.

The operating regime is indicative of: a power setting for the heat engine; an angle of a vane within the heat engine; or operation of another component operatively coupled to the heat engine.

The values within the database may be corrected for variability in operating conditions and/or variability in operating regimes.

The confidence bands may be established for between eighty percent and ninety-five percent confidence.

The confidence bands may be established for 3 sigma confidence.

The action may be or include updating the database to include the first updated value to provide a first updated database where the first updated value is within the confidence bands.

The method may also include: establishing first updated confidence bands using the probability density function on the first updated database; and performing a second action in response to a comparison of a second updated value for the parameter to the first updated confidence bands.

The action may be or include providing a notification where the first updated value is outside of the confidence bands.

The method may also include: predicting a trend for one or more future values of the parameter over a future period of time; extrapolating the confidence bands over the future period of time to provide extrapolated confidence bands; and performing a second action where the trend crosses one of the extrapolated confidence bands.

The method may also include: predicting a trend for one or more future values of the parameter over a future period of time; and performing a second action where the trend crosses an operating limit for the parameter.

The method may also include: predicting a trend for one or more future values of the parameter over a future period of time; and performing a second action where a change in a slope of the trend is greater than a threshold.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
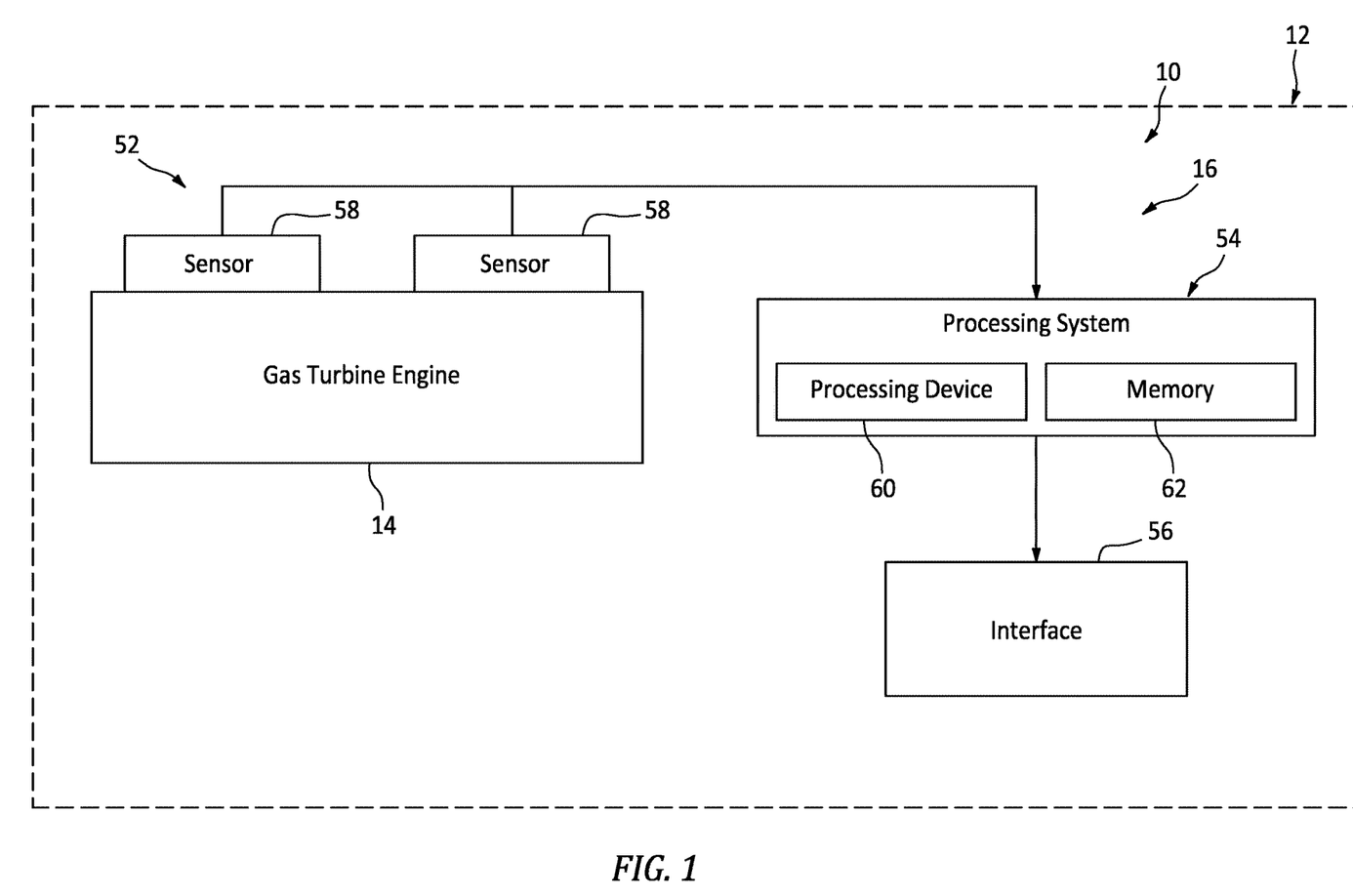
FIG. 1 is a schematic illustration of a gas turbine engine system for an aircraft.

FIG. 1 is a schematic illustration of a gas turbine engine system 10 for an aircraft 12. This engine system 10 includes a gas turbine engine 14 and an engine (e.g., health) monitoring system 16.

The gas turbine engine 14 may be included within a propulsion system for the aircraft 12. The gas turbine engine 14, for example, may be configured as a turbofan gas turbine engine, a turbojet gas turbine engine, a turboprop gas turbine engine or a turboshaft gas turbine engine. The gas turbine engine 14 may alternatively be included within an electrical power generation system. The gas turbine engine 14, for example, may be configured as an auxiliary power unit (APU). The gas turbine engine 14 of the present disclosure, however, is not limited to the foregoing exemplary gas turbine engine types. Furthermore, the gas turbine engine 14 may also be configured for non-aircraft applications. The gas turbine engine 14, for example, may be configured as a (e.g., ground-based) industrial gas turbine engine for an electrical power generation system. The gas turbine engine 14 of the present disclosure may be configured with a single spool, with two spools (e.g., see FIG. 2), or with more than two spools depending on, for example, aircraft power requirements.

Figure 2:
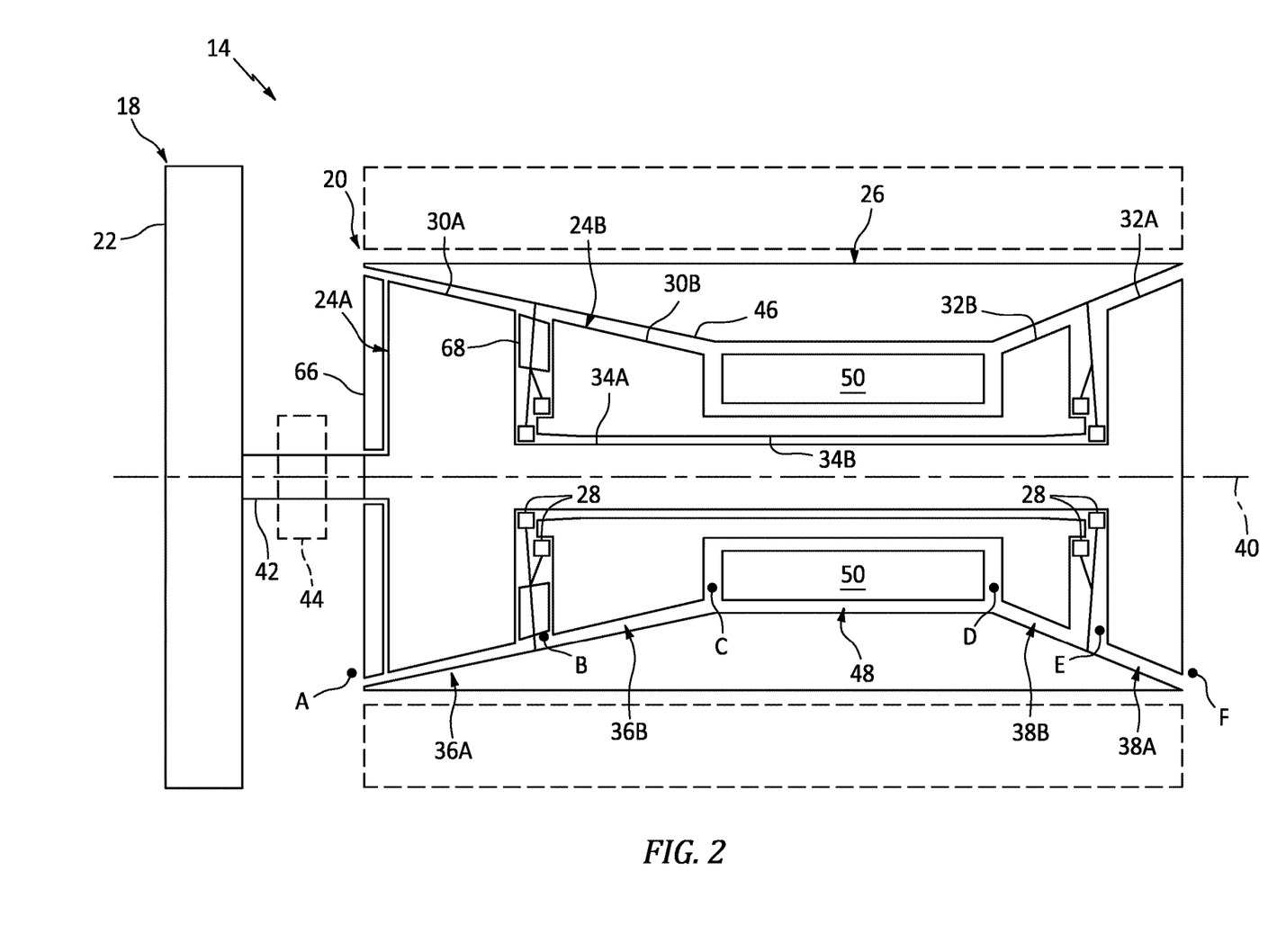
FIG. 2 is a schematic side sectional illustration of a gas turbine engine.

Referring to FIG. 2, the gas turbine engine 14 may include a mechanical load 18 and a gas turbine engine core 20 configured to drive rotation of the mechanical load 18. The mechanical load 18 is configured as or otherwise includes a rotor 22 of the gas turbine engine 14. The mechanical load 18, for example, may be configured as a bladed propulsor rotor for the aircraft propulsion system. Examples of the propulsor rotor include, but are not limited to: a fan rotor for the turbofan gas turbine engine; a compressor rotor for the turbojet gas turbine engine; a propeller rotor for the turboprop gas turbine engine; and a helicopter rotor (e.g., a main rotor) for the turboshaft gas turbine engine. The mechanical load 18 may alternatively be configured as a generator rotor for the power generation system.

The engine core 20 of FIG. 2 includes one or more rotating structures 24A and 24B (generally referred to as "24") (e.g., spools) and a stationary structure 26. The engine core 20 of FIG. 2 also includes a plurality of bearings 28 rotatably mounting the rotating structures 24 to the stationary structure 26.

The first (e.g., low speed) rotating structure 24A includes a first (e.g., low pressure (LP)) compressor rotor 30A, a first (e.g., low pressure) turbine rotor 32A and a first (e.g., low speed) shaft 34A. The first compressor rotor 30A is arranged within and part of a first (e.g., low pressure) compressor section 36A of the engine core 20. The first turbine rotor 32A is arranged within and part of a first (e.g., low pressure) turbine section 38A of the engine core 20. The first shaft 34A extends axially along a rotational axis 40 between and is connected to the first compressor rotor 30A and the first turbine rotor 32A, where the first rotating structure 24A is rotatable about the rotational axis 40.

The first rotating structure 24A may also be rotatably coupled to the mechanical load 18 and its rotor 22. The mechanical load 18 and its rotor 22, for example, may be coupled to the first rotating structure 24A through a direct drive coupling. This direct drive coupling may be configured as or otherwise include an output shaft 42. With such a direct drive coupling, the mechanical load 18 and its rotor 22 and the first rotating structure 24A may rotate at a common (e.g., the same) rotational speed. Alternatively, the mechanical load 18 and its rotor 22 may be coupled to the first rotating structure 24A through a geartrain 44 (see dashed line); e.g., a transmission. This geartrain 44 may be configured as an epicyclic geartrain. With such a geared coupling, the mechanical load 18 and its rotor 22 may rotate at a different (e.g., slower) rotational speed than the first rotating structure 24A.

The second (e.g., high speed) rotating structure 24B includes a second (e.g., high pressure (HP)) compressor rotor 30B, a second (e.g., high pressure) turbine rotor 32B and a second (e.g., high speed) shaft 34B. The second compressor rotor 30B is arranged within and part of a second (e.g., high pressure) compressor section 36B of the engine core 20. The second turbine rotor 32B is arranged within and part of a second (e.g., high pressure) turbine section 38B of the engine core 20. The second shaft 34B extends axially along the rotational axis 40 between and is connected to the second compressor rotor 30B and the second turbine rotor 32B, where the second rotating structure 24B is rotatable about the rotational axis 40. The second rotating structure 24B of FIG. 2 and its second shaft 34B axially overlap and circumscribe the first shaft 34A; however, the engine core 20 of the present disclosure is not limited to such an exemplary arrangement.

The stationary structure 26 includes an engine case 46. This engine case 46 is configured to at least partially or completely house the first compressor section 36A, the second compressor section 36B, a combustor section 48 of the engine core 20, the second turbine section 38B and the first turbine section 38A, where the engine sections 36A, 36B, 48, 38B and 38A may be arranged sequentially along the rotational axis 40 between an airflow inlet to the gas turbine engine 14 and an exhaust from the gas turbine engine 14. The engine case 46 of FIG. 2 axially overlaps and extends circumferentially about (e.g., completely around) the first rotating structure 24A and the second rotating structure 24B.

During operation, air enters the gas turbine engine 14 through the airflow inlet. This air is directed into at least a core flowpath which extends sequentially through the engine sections 36A, 36B, 48, 38B and 38A (e.g., the engine core 20) to the exhaust. The air within this core flowpath may be referred to as "core air".

The core air is compressed by the first compressor rotor 30A and the second compressor rotor 30B and directed into a combustion chamber 50 of a combustor in the combustor section 48. Fuel is injected into the combustion chamber 50 and mixed with the compressed core air to provide a fuel-air mixture. This fuel-air mixture is ignited and combustion products thereof flow through and sequentially cause the second turbine rotor 32B and the first turbine rotor 32A to rotate. The rotation of the second turbine rotor 32B and the first turbine rotor 32A respectively drive rotation of the second compressor rotor 30B and the first compressor rotor 30A and, thus, compression of the air received from the airflow inlet. The rotation of the first turbine rotor 32A of FIG. 2 also drives rotation of the mechanical load 18 and its rotor 22. Where the rotor 22 is configured as the propulsor rotor, the rotor 22 propels additional air through or outside of the engine core 20 to provide, for example, a majority of aircraft propulsion system thrust. Where the rotor 22 is configured as the generator rotor, rotation of the rotor 22 facilitates generation of electricity.

Referring again to FIG. 1, the monitoring system 16 is configured to monitor operation (e.g., health) of at least the gas turbine engine 14 during operation of the aircraft 12. The monitoring system 16 includes a sensor system 52 and a processing system 54. The monitoring system 16 of FIG. 1 also includes an interface 56.

The sensor system 52 includes one or more sensors 58 arranged with the gas turbine engine 14. The sensor system 52 and its sensors 58 are configured for measuring one or more operational parameters for the gas turbine engine 14. Examples of the operational parameters include, but are not limited to:

- Rotational speed of a component within the gas turbine engine 14 such as, but not limited to, any one of the components 22, 24A, 24B, 30A, 30B, 32A, 32B, 34A, 34B of FIG. 2;
- Absolute or differential pressure within the gas turbine engine 14 such as, but not limited to, first compressor (e.g., LPC) section pressure, second compressor (e.g., HPC) section pressure, combustor section pressure, second turbine (e.g., HPT) section pressure or first turbine (e.g., LPT) section pressure; and
- Absolute or differential temperature within the gas turbine engine 14 such as, but not limited to, first compressor (e.g., LPC) section temperature, second compressor (e.g., HPC) section temperature, combustor section temperature, second turbine (e.g., HPT) section temperature or first turbine (e.g., LPT) section temperature.

Any one or more or all of the operational parameters may be sensed/measured at a single location within the gas turbine engine 14/along the core flowpath, or at multiple locations within the gas turbine engine 14/along the core flowpath to provide additional sensor feedback and/or determine a differential. The pressure and/or the temperature, for example, may be sensed/measured at or about any one or more of the following locations within the gas turbine engine 14:

- A compressor inlet location (e.g., see A of FIG. 2);
- An inter-compressor location (e.g., see B in FIG. 2);
- A compressor outlet location and/or a combustor inlet location (e.g., see C of FIG. 2);
- A combustor outlet location and/or a turbine inlet location (e.g., see D of FIG. 2);
- An inter-turbine location (e.g., see E in FIG. 2);
- A turbine outlet location (e.g., see F of FIG. 2); or
- Any other location/region along the core flowpath.

The processing system 54 is in signal communication with the sensor system 52 and the interface 56. The processing system 54 of FIG. 1, more particularly, is hardwired and/or wirelessly coupled with the sensors 58 and the interface 56. This processing system 54 may be implemented with a combination of hardware and software. The hardware may include at least one processing device 60 and memory 62, where the processing device 60 may include one or more single-core and/or multi-core processors. The hardware may also or alternatively include analog and/or digital circuitry other than that described above.

The memory 62 is configured to store software (e.g., program instructions) for execution by the processing device 60, which software execution may control and/or facilitate performance of one or more operations such as those described herein. The memory 62 may be a non-transitory computer readable medium. For example, the memory 62 may be configured as or include a volatile memory and/or a nonvolatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EEPROM), a computer hard drive, etc.

The interface 56 is configured to communicate and/or transfer information received from the processing system 54 and its processing device 60. The interface 56, for example, may be configured as a user interface. This user interface may include a display screen, an indicator light and/or an electroacoustic transducer (e.g., a speaker). With such an arrangement, the interface 56 is configured to visually and/or audibly present the information to a user; e.g., personnel operating the gas turbine engine 14 such as a pilot, personnel servicing the gas turbine engine 14 (e.g., maintenance personnel), personnel monitoring performance of the gas turbine engine 14 and/or the aircraft 12, etc. The interface 56 may also or alternatively be configured as a device for transferring the information to another device and/or system. The interface 56, for example, may be configured as or otherwise include a (e.g., output) terminal or a signal transmitter.

The monitoring system 16 and the interface 56 may be arranged onboard the aircraft 12 as generally described above. Alternatively, one or more components and/or functionalities of the monitoring system 16 and/or the interface 56 may be performed off-board the aircraft 12, or duplicated off-board of the aircraft 12, for example, for long term monitoring.

Figure 3:
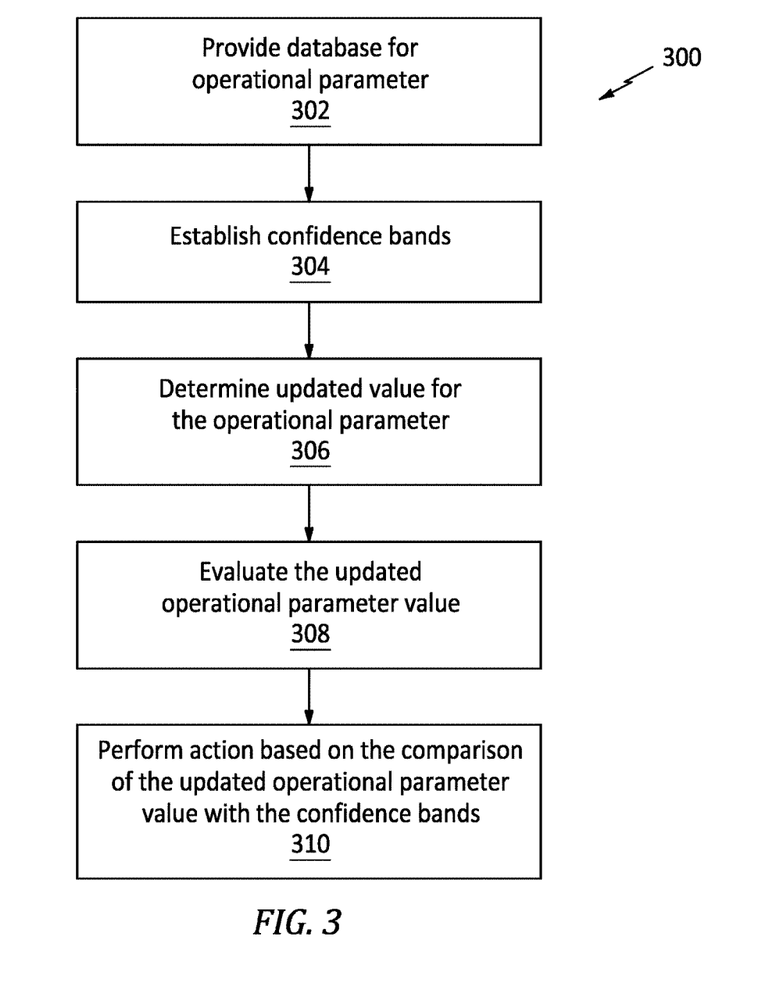
FIG. 3 illustrates a flow diagram of a method for monitoring gas turbine engine operation.

FIG. 3 is a flow diagram of method 300 for monitoring gas turbine engine operation. For ease of description, this method 300 is described below with respect to the engine system 10 and its gas turbine engine 14 and its monitoring system 16. The method 300 of the present disclosure, however, is not limited to the foregoing exemplary gas turbine engine and/or monitoring system configuration.

In step 302, a database is compiled or otherwise provided for at least (or only) one of the operational parameters. This database includes a plurality of (e.g., saved) values for the operational parameter of interest determined over a (e.g., rolling) period of time, where the database and its values are saved within the memory 62. The database may be a rolling database. The database, for example, may be setup to include X-number of (e.g., 100, 1000, etc.) entries—operational parameter values. Once the database is filled with the X-number of entries, an oldest one of the saved operational parameter values is removed such that there is room to save an updated (e.g., new) operational parameter value in the database. The updated operation parameter value thereby replaces (e.g., takes the place of) the oldest operational parameter value within the database to provide a compilation of the most recent operation parameter values.

The operational parameter values within the database may be determined using the sensor system 52 when the gas turbine engine 14 is operated at, or within a select tolerance (e.g., +/−1%, 2% or 5%) of, a select operating condition (or select operating conditions) and/or a select operating regime (or select operating regimes). Examples of the operating condition(s) include, but are not limited to:

- An altitude of the aircraft 12 and, thus, the gas turbine engine 14;
- A ground and/or air speed of the aircraft 12 and, thus, the gas turbine engine 14;
- A temperature of ambient air outside of the aircraft 12/the gas turbine engine 14; and/or
- A temperature of air within (e.g., the inlet) of the gas turbine engine 14.

Examples of the operating regime(s) include, but are not limited to:
- A power setting (e.g., power lever angle (PLA), a pilot requested power/thrust) for the gas turbine engine 14;
- An angle of a variable inlet guide vane (e.g., 66) for the gas turbine engine 14;
- An angle of a variable guide vane (e.g., 68) within a (e.g., compressor) section of the gas turbine engine 14; and/or
- Operation of another component operatively coupled to the gas turbine engine 14 such as, for example, a bleed valve, a power takeoff, etc.

Under such operating condition(s) and/or operating regime(s), sensor data provided to the processing system 54 from the sensor system 52 and its sensors 58 may be entered (e.g., saved, stored, etc.) into the database without, for example, further processing. The database, for example, may include the raw data (or a subset thereof) measured/sensed by the sensor system 52, where that raw data (or the subset thereof) is indicative of the operational parameter values.

Alternatively, the operational parameter values may be determined at varying operating condition(s) and/or operating regime(s). In such embodiments, the raw data (or a subset thereof) measured/sensed by the sensor system 52 may be partially processed by the processing system 54 to correct (e.g., normalize) the data. For example, a corrected (e.g., normalized) temperature at a station x (e.g., within the compressor) may be determined as follows:

$$TxC = \frac{Tx - n*dTamb}{T(SL, ISA)} - m\left(\frac{P10}{Pamb} - 1\right) + k*alt$$

where:
- TxC is the corrected temperature at the station x;
- Tx is a total temperature at the station x, measured or synthesized;
- n is an ISA temperature deviation correction factor;
- dTamb is an ISA temperature deviation;
- T(SL,ISA) is a sea-level ISA ambient temperature;
- m is an airspeed correction factor;
- P10 is a total pressure at engine inlet, measured or synthesized;
- Pamb is an ambient pressure at operating altitude;
- k is an altitude correction factor; and
- alt is an operating altitude.

The present disclosure, of course, is not limited to the foregoing exemplary correction formula or formula variables.

Figure 4:
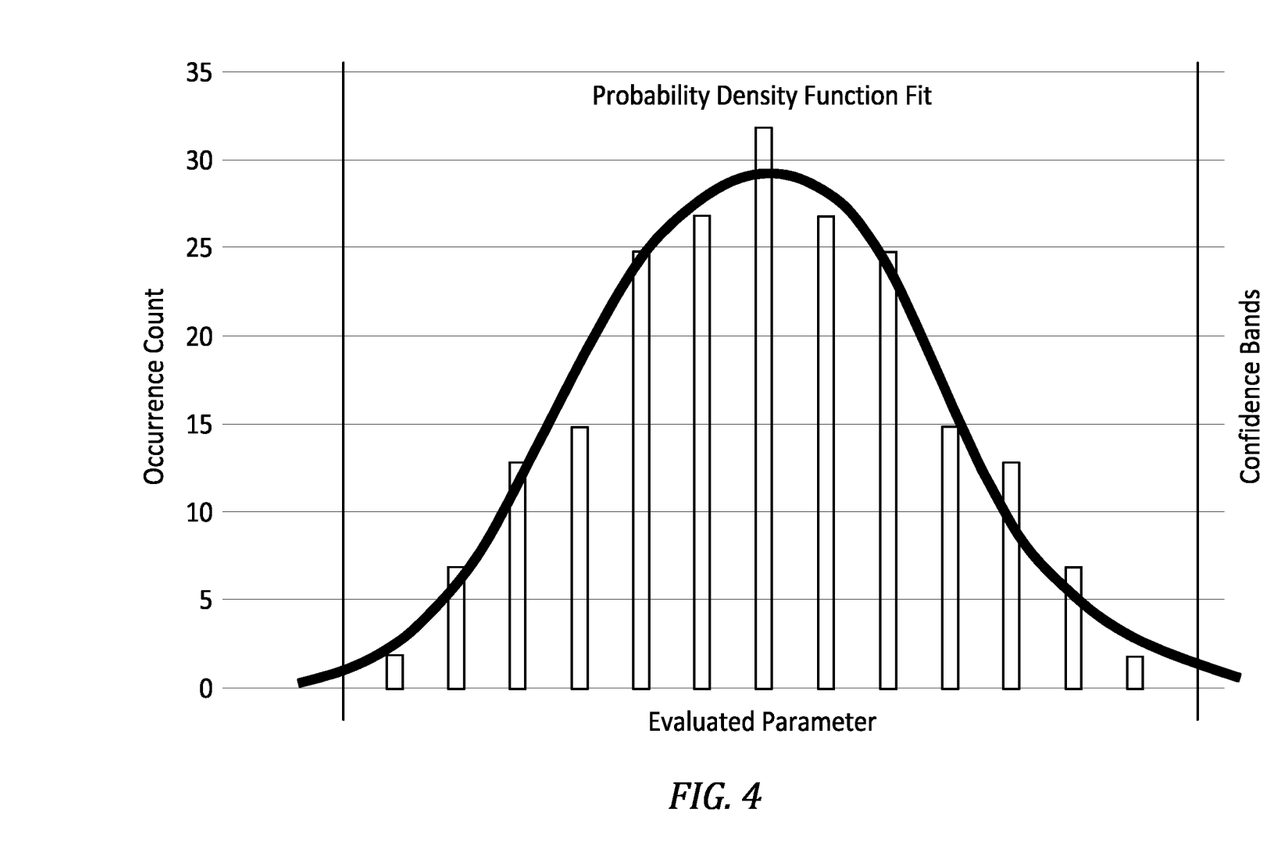
FIG. 4 is a graphical illustration of a probability density function fitting and confidence band setting for a (e.g., rolling) sample period of time.
Figure 5:
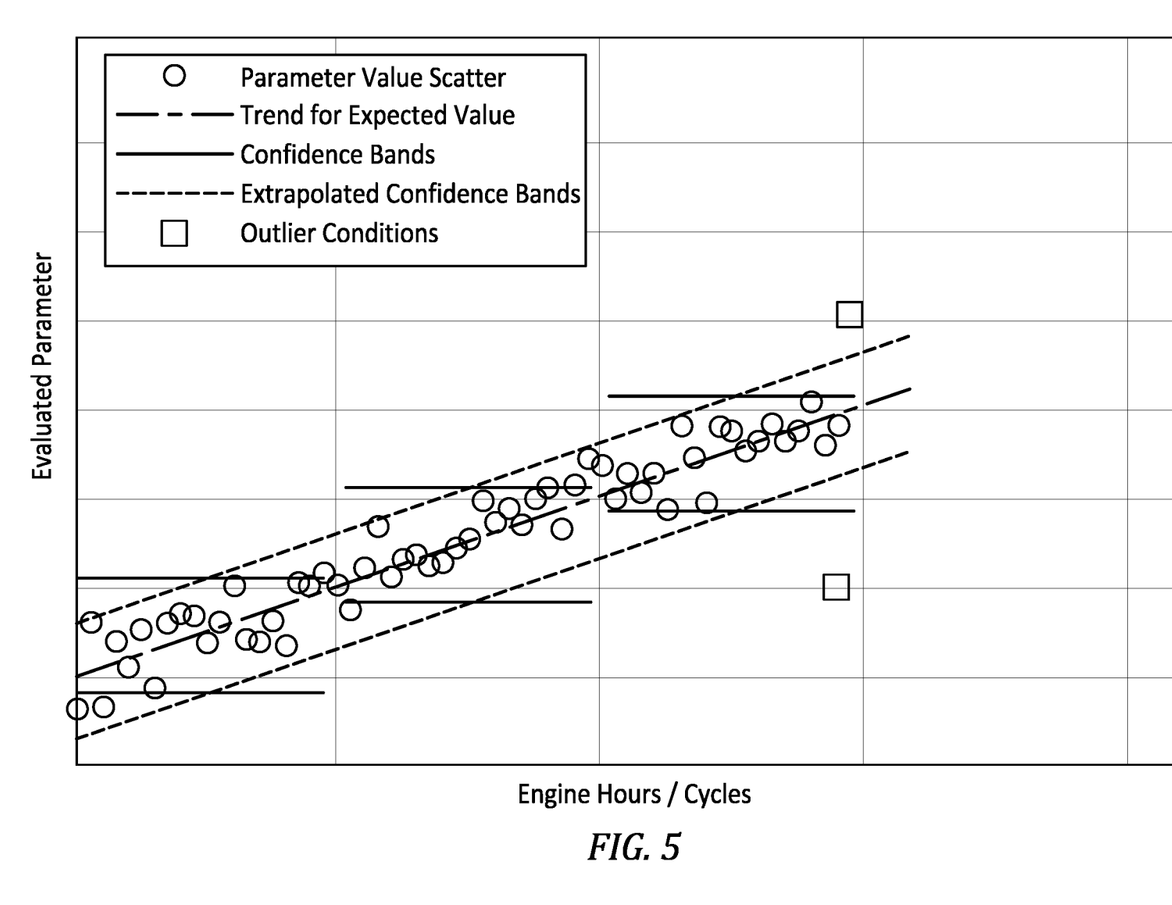
FIG. 5 is a graphical illustration of operational parameter data plotted versus time.

In step 304, statistical confidence bands (e.g., lower and upper bounds) are established using a statistical function on the operational parameter values in the database. For example, referring to FIG. 4, the processing device 60 may process the operational parameter values in the database using a probability density function to determine the confidence bands. These confidence bands may be established for a percent confidence between, for example, seventy-five percent (75%) and ninety-five percent (95%) confidence; e.g., eight percent (80%), ninety percent (90%) or ninety-five percent (95%) confidence. The confidence bands may alternatively be established for 3 sigma confidence. Referring to FIG. 5, the confidence bands represent lower and upper bounds for the scatter of the operational parameter values in the database for particular points/periods of time.

In step 306, an updated value for the operational parameter of interest is determined. This updated operational parameter value may be determined in the same fashion as the operational parameter values discussed above; e.g., the values already stored in the database. However, the updated operational parameter value is determined subsequent to the period of time represented by the operational parameter values currently stored in the database. The updated operational parameter value, for example, may be determined during a time step immediately following (or delayed from) the last time step in the period of time represented by the operational parameter values currently stored in the database. The updated operational parameter value may thereby be indicative of a most recent determination (e.g., measure, synthesis, etc.) of the parameter of interest.

In step 308, the updated operational parameter value is evaluated. The processing device 60, for example, may determine whether the updated operational parameter value was determined while the gas turbine engine 14 was operating at, or within the select tolerance of, the select operating condition(s) and/or the select operating regime(s) of the operational parameter values within the database. If not, then the updated operational parameter value may be stored in another database in the memory 62 for another select set of operating condition(s) and/or operating regime(s). The method 300 may then return to the step 306 for another updated operational parameter value. However, if the operating condition(s) and/or operating regime(s) match, then the method 300 may continue. Of course, such matching may not be required where the updated operational parameter value is corrected (e.g., normalized) for varying operating condition(s) and/or operating regime(s).

In step 310, an action is performed (or otherwise initiated) in response to a comparison (e.g., fitting) of the updated operational parameter value with/to the confidence bands. For example, where the processing device 60 determines the updated operational parameter value is within bounds of (e.g., between) the confidence bands, the updated operational parameter may be stored in the database. This updated operational parameter value may take the place of the oldest (e.g., first stored) operational parameter value within the database where, for example, the database is the rolling database. The method 300 may then revert to the step 304 for the now updated database.

Where the processing device 60 determines the updated operational parameter value is (or a certain number of operational parameter values are) outside the bounds of (e.g., between) the confidence bands, the processing system 54 may notify the user through, for example, the interface 56. For example, the notification may inform the user that there is an anomaly in the observed operational parameter which may be indicative of gas turbine engine deterioration. The notification may trigger a service alert for the next time the aircraft 12 is on the ground, etc. In addition or alternatively, the data may be stored (e.g., within the memory 62 or otherwise) for future analysis.

Figure 6:
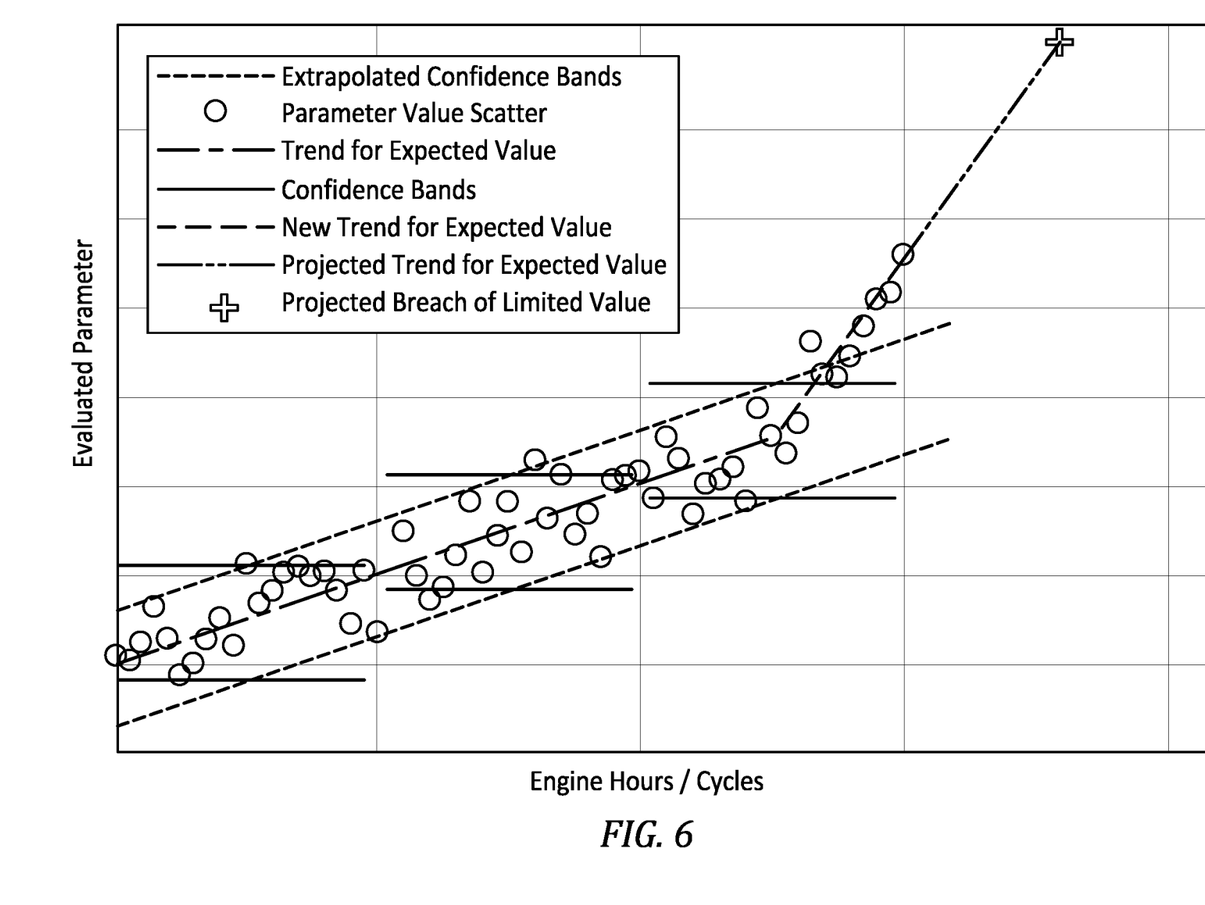
FIG. 6 is a graphical illustration of operational parameter data and predicted parameter data plotted versus time.

In some embodiments, referring to FIG. 6, the processing device 60 may predict a trend for one or more future values of the operational parameter of interest over a future period of time. The processing system 54 may extrapolate the confidence bands over the future period of time to provide extrapolated confidence bands. Where the trend is predicted to cross one of the extrapolated confidence bands, another action may be performed or otherwise initiated. The processing system 54, for example, may notify the user through the interface 56. The notification may inform the user that there is predicted to be an anomaly in the observed operational parameter which may be indicative of gas turbine engine deterioration. The notification may trigger a service alert for the next time the aircraft 12 is on the ground, etc. In addition or alternatively, the data may be stored (e.g., within the memory 62) for future analysis.

In some embodiments, the processing system 54 may also or alternatively perform or otherwise initiate another action where the trend meet or crosses an operative limit of the parameter of interest. The processing system 54, for example, may notify the user through the interface 56. The notification may trigger a service alert for the next time the aircraft 12 is on the ground. The gas turbine engine 14 may thereby be overhauled or replaced prior to meeting the operational limit. In addition or alternatively, the data may be stored (e.g., within the memory 62) for future analysis.

In some embodiments, the processing system 54 may also or alternatively monitor a slope of the trend. Where a change in the slope is greater than a threshold, then the processing system 54 may perform or otherwise initiate another action. The processing system 54, for example, may notify the user through the interface 56. The notification may inform the user that there is predicted to be an anomaly in the observed operational parameter which may be indicative of gas turbine engine deterioration. The notification may trigger a service alert for the next time the aircraft 12 is on the ground, etc. In addition or alternatively, the data may be stored (e.g., within the memory 62) for future analysis.

Figure 7A:
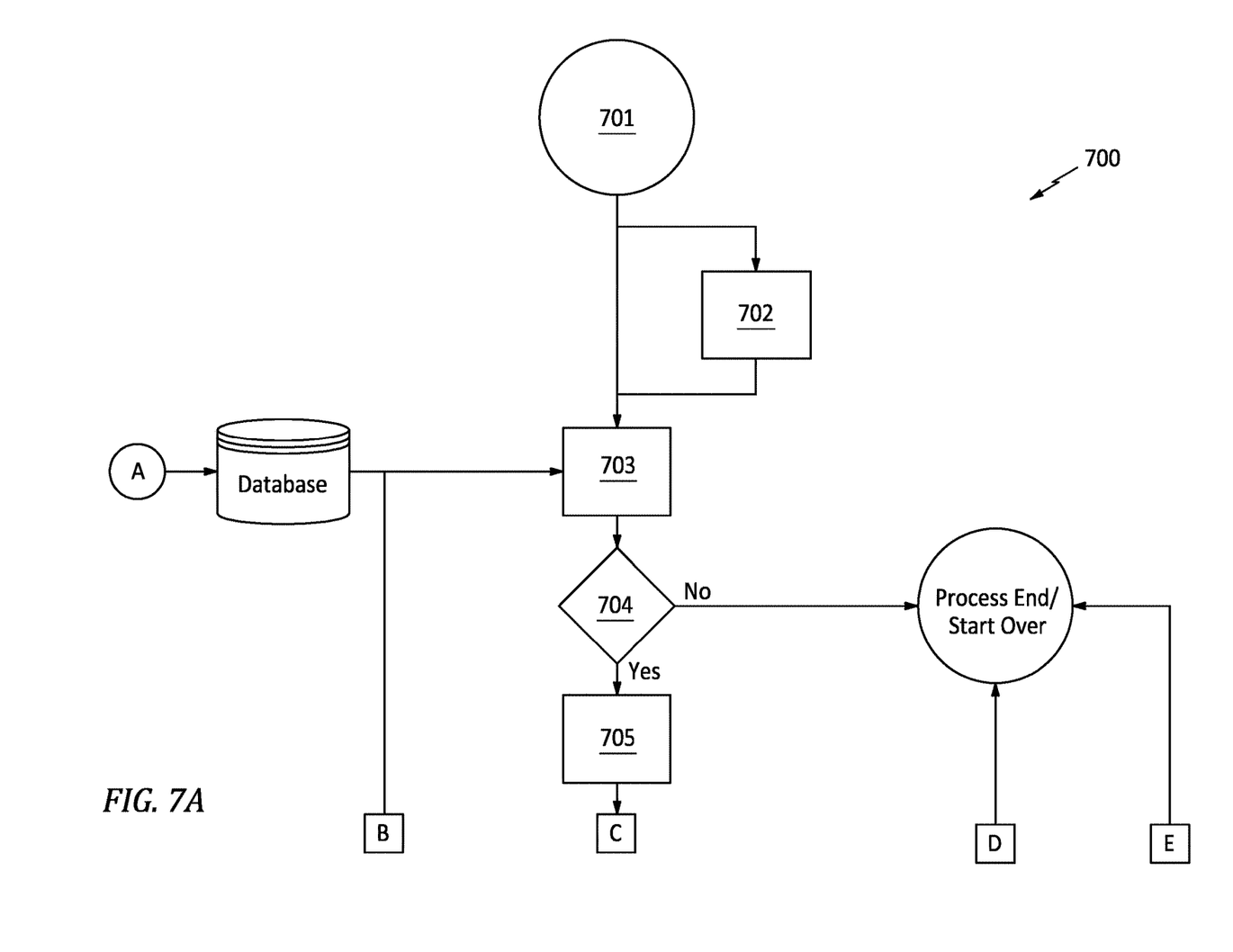
FIGS. 7A and 7B collectively illustrate a flow diagram of another method for monitoring gas turbine engine operation.
Figure 7B:
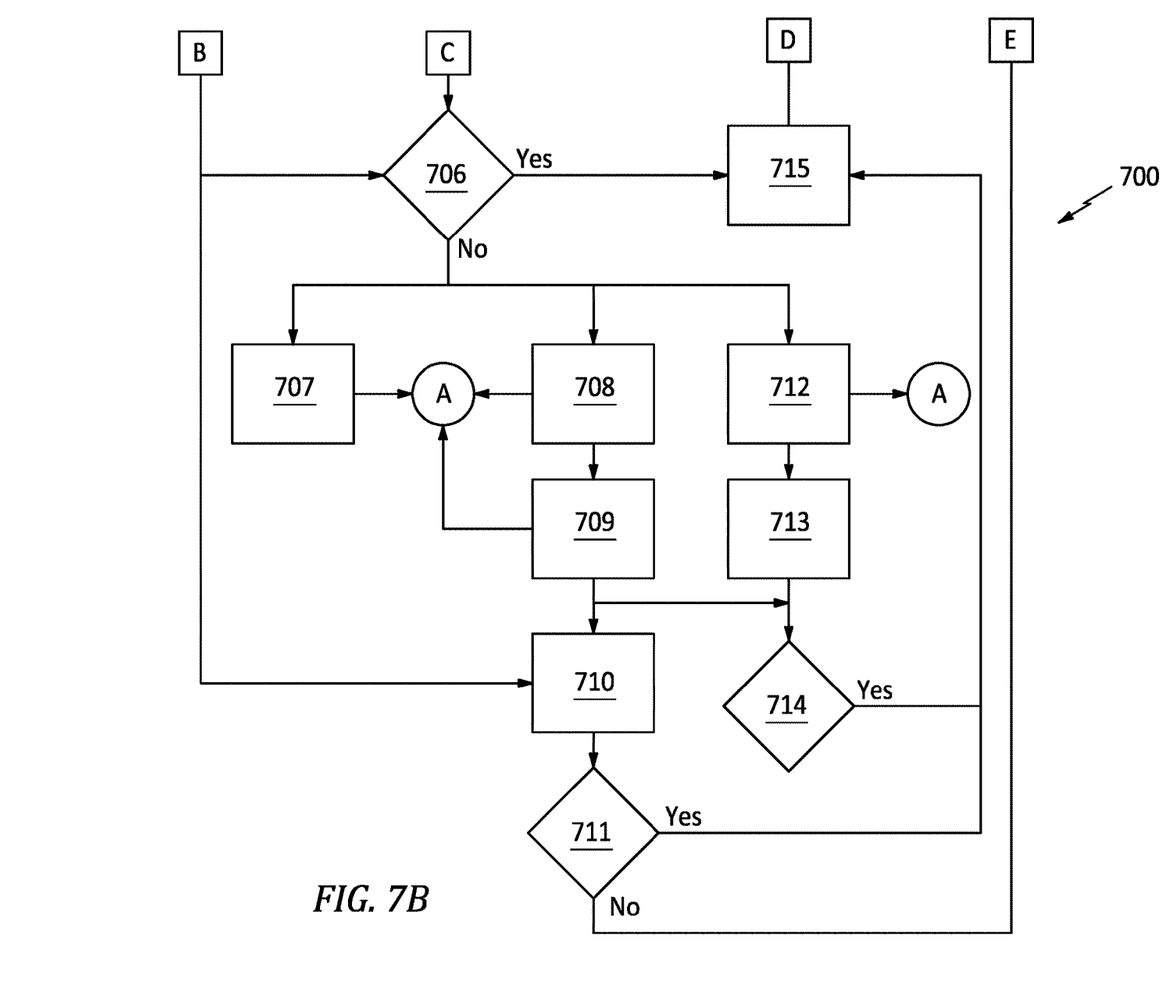

FIGS. 7A and 7B collectively illustrate a flow diagram of another method 700 for monitoring gas turbine engine operation, which method 700 incorporates some or all of the foregoing steps from the method 300. For ease of description, this method 700 is described below with respect to the engine system 10 and its gas turbine engine 14 and its monitoring system 16. The method 700 of the present disclosure, however, is not limited to the foregoing exemplary gas turbine engine and/or monitoring system configuration. The method 700 is also described below with reference to certain operations described above with respect to the method 300.

In step 701, a value for the operational parameter(s) of interest is determined; e.g., measured, synthesized, etc.

In step 702, the operational parameter value is corrected; e.g., normalized. Of course, the step 702 may be omitted where the operational parameter value was determined during the select operating condition(s) and/or operating regime(s).

In step 703, the operating condition(s) and/or operating regime(s) associated with the operational parameter value determined in the step 701 are compared to operating condition(s) and/or operating regime(s) associated with operational parameter value(s) previously stored within the memory 62.

In step 704, if the operating condition(s) and/or operating regime(s) compared in the step 703 do not match, the operational parameter value determined in the step 701 is stored in a new database for the respective operating condition(s) and/or operating regime(s). The method 700 then reverts to the step 701 to repeat after a select interval of time. However, if the operating condition(s) and/or operating regime(s) compared in the step 703 do match, the method 700 continues.

In step 705, the operational parameter value determined in the step 701 is added to the existing scatter (e.g., previously recorded operational parameter values) in the database with the matching operating condition(s) and/or operating regime(s).

In step 706, the operational parameter value determined in the step 701 is compared to existing (e.g., pre-established) confidence bands. Where the operation parameter value is outside of the confidence bands, the method 700 proceeds to step 715. Where the operation parameter value is within of the confidence bands, the method 700 proceeds to steps 707, 708 and/or 712.

In the step 707, the newly added operational parameter value is used to refresh a rolling average probability density function fit. The database may then be updated with refreshed expected further values for the operational parameter of interest.

In step the 708, the newly added operational parameter value is used to refresh a rolling average expected (e.g., average) value for the operational parameter of interest. The database may then be updated with the refreshed expected value for the operational parameter of interest.

In step the 709, a trend for the expected value is extrapolated and the extrapolation may be recorded in the database.

In step 710, a slope of the trend is compared with previous recordings form the database.

In step 711, where a significant shift in parameter evolution is detected, the method 700 proceeds to the step 715. However, where a significant shift in the parameter evolution is not detected, the method 700 reverts to the step 701 to repeat after a select interval of time.

In step 712, the newly added operational parameter value is used to refresh the rolling average confidence bands. The database may then be updated with refreshed (e.g., updated) confidence bands.

In step 713, the confidence bands are extrapolated.

In step 714, an extrapolated trend for the expected values is compared to the extrapolated confidence bands and an operating limit for the operation parameter of interest. If a breach through the extrapolated confidence bands or an exceedance over the operating limit is predicted before maintenance is currently scheduled for the gas turbine engine 14, then the method 700 proceeds to the step 715. Otherwise, the method 700 reverts to the step 701 to repeat after a select interval of time.

In the step 715, a flag is raised (e.g., a notification is provided) and a maintenance event/a service alert may be triggered. The method 700 may then revert to the step 701 to repeat after a select interval of time.

The period of time associate with data stored in the database may be a relatively short period of time; e.g., time during a single mission/flight. Alternatively, the period of time may be a relatively long period of time; e.g., time across multiple missions/flights. The database may thereby be used to monitor operation of the gas turbine engine 14 over multiple missions/flights.

The methods are described above with reference to monitoring a single operational parameter. The methods of the present disclosure, however, may alternatively monitory multiple operational parameters (e.g., simultaneously) to provide a more complete picture of gas turbine engine operation and/or check for false-positives. For example, a notification may only be issued where two different (but, perhaps related) operational parameters include anomalies.

An evolution of compressor work split/work balance may be evaluated by monitoring trends in the operational parameter values and/or the above data derived therefrom. First compressor (e.g., LPC) section and second compressor (e.g., HPC) section work (e.g., compression), for example, may be proportional to a temperature rise and/or a pressure rise across other sections of the gas turbine engine 14. For example, a decreasing trend in the first compressor (e.g., LPC) section work may indicate deterioration of the first turbine (e.g., LPT) section. A decreasing trend in the second compressor (e.g., HPC) section work may indicate deterioration of the second turbine (e.g., HPT) section. This may also be combined with a decreasing trend in the rotating speed of the second (e.g., high speed) rotating assembly. A decreasing trend in first compressor (e.g., LPC) section work combined with an increasing trend in second compressor (e.g., HPC) section work may indicate a work split imbalance within the compressor towards the second compressor section. A decreasing trend in second compressor (e.g., HPC) section work combined with an increasing trend in first compressor (e.g., LPC) work may indicate a work split imbalance within the compressor towards the first compressor section. An increasing trend in first compressor (e.g., LPC) section work may indicate deterioration of the first compressor section. An increasing trend in second compressor (e.g., HPC) section work may indicate deterioration of the second compressor section.

While the engine systems and methods are described above with respect to a gas turbine engine, the present disclosure is not limited thereto. It is contemplated, for example, the engine systems and methods disclosed herein may also be implemented with other types of heat engines such as, but not limited to, a reciprocating piston internal combustion (IC) engine or a rotary internal combustion (IC) engine.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A method for a heat engine, comprising:
   providing a database for a parameter of the heat engine, the database including a plurality of values for the parameter determined over a period of time;
   establishing confidence bands using a probability density function on the database;
   performing an action in response to a comparison of a first updated value for the parameter to the confidence bands;
   predicting a trend for one or more future values of the parameter over a future period of time; and
   performing a second action where the trend crosses an operating limit for the parameter.

2. The method of claim 1, wherein the heat engine comprises a gas turbine engine.

3. The method of claim 1, wherein the parameter is indicative of:
   a temperature within the heat engine;
   a pressure within the heat engine; or
   a rotational speed of a component within the heat engine.

4. The method of claim 1, wherein the plurality of values within the database are determined when the heat engine is operated at, or within a tolerance of, an operating condition.

5. The method of claim 4, wherein the operating condition is indicative of:
   an altitude;
   a speed;
   a temperature of ambient air outside of the heat engine; or
   a temperature of air within the heat engine.

6. The method of claim 1, wherein the plurality of values within the database are determined when the heat engine is operated at, or within a tolerance of, an operating regime.

7. The method of claim 6, wherein the operating regime is indicative of:
   a power setting for the heat engine;
   an angle of a vane within the heat engine; or
   operation of another component operatively coupled to the heat engine.

8. The method of claim 1, wherein the plurality of values within the database are corrected for variability in operating conditions and/or variability in operating regimes.

9. The method of claim 1, wherein the confidence bands are established for between eighty percent and ninety-five percent confidence.

10. The method of claim 1, wherein the confidence bands are established for 3 sigma confidence.

11. The method of claim 1, wherein the action comprises updating the database to include the first updated value to provide a first updated database where the first updated value is within the confidence bands.

12. The method of claim 11, further comprising:
    establishing first updated confidence bands using the probability density function on the first updated database; and
    performing a third action in response to a comparison of a second updated value for the parameter to the first updated confidence bands.

13. The method of claim 1, wherein the action comprises providing a notification where the first updated value is outside of the confidence bands.

14. A method for a heat engine, comprising:
    providing a database for a parameter of the heat engine, the database including a plurality of values for the parameter determined over a period of time;
    establishing confidence bands using a probability density function on the database;
    performing an action in response to a comparison of a first updated value for the parameter to the confidence bands;
    predicting a trend for one or more future values of the parameter over a future period of time; and
    performing a second action where a change in a slope of the trend is greater than a threshold.

15. A method for a heat engine, comprising:
    providing a database for a parameter of the heat engine, the database including a plurality of values for the parameter determined over a period of time;
    establishing confidence bands using a probability density function on the database;
    extrapolating the confidence bands over a future period of time to provide extrapolated confidence bands;
    predicting a trend for one or more future values of the parameter over the future period of time; and
    performing an action where the trend crosses one of the extrapolated confidence bands.

16. The method of claim 15, further comprising performing another action where at least one of
    the trend crosses an operating limit for the parameter; or
    a change in a slope of the trend is greater than a threshold.

17. The method of claim 15, further comprising:
    receiving a first updated value for the parameter; and
    performing an action in response to a comparison of the first updated value to the confidence bands.

18. The method of claim 14, wherein the parameter is indicative of:
- a temperature within the heat engine;
- a pressure within the heat engine; or
- a rotational speed of a component within the heat engine.

19. The method of claim 14, wherein
- the plurality of values within the database are determined when the heat engine is operated at, or within a tolerance of, an operating condition; and
- the operating condition is indicative of
  - an altitude;
  - a speed;
  - a temperature of ambient air outside of the heat engine; or
  - a temperature of air within the heat engine.

20. The method of claim 14, wherein
- the plurality of values within the database are determined when the heat engine is operated at, or within a tolerance of, an operating regime; and
- the operating regime is indicative of
  - a power setting for the heat engine;
  - an angle of a vane within the heat engine; or
  - operation of another component operatively coupled to the heat engine.

* * * * *